(12) United States Patent
Sakaguchi

(10) Patent No.: US 8,576,834 B2
(45) Date of Patent: Nov. 5, 2013

(54) COMMUNICATION SYSTEM

(75) Inventor: Hiroyuki Sakaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1180 days.

(21) Appl. No.: 11/723,283

(22) Filed: Mar. 19, 2007

(65) Prior Publication Data

US 2008/0013525 A1 Jan. 17, 2008

(30) Foreign Application Priority Data

Jul. 13, 2006 (JP) ................................. 2006-193141

(51) Int. Cl.
*H04L 12/66* (2006.01)
*H04M 3/42* (2006.01)
*H04M 1/00* (2006.01)

(52) U.S. Cl.
USPC .................... 370/352; 379/201.02; 455/456.1

(58) Field of Classification Search
USPC ............... 370/352–356; 379/201.02, 211.03, 379/211.04; 455/456.1
See application file for complete search history.

(56) References Cited

U.S. PATENT DOCUMENTS

| | | | |
|---|---|---|---|
| 2002/0138603 A1 | 9/2002 | Robohm | |
| 2003/0210770 A1* | 11/2003 | Krejcarek | 379/88.17 |
| 2005/0207402 A1* | 9/2005 | Kobayashi et al. | 370/352 |
| 2006/0133345 A1 | 6/2006 | Benco et al. | |
| 2007/0064918 A1 | 3/2007 | Son | |
| 2007/0201376 A1* | 8/2007 | Marshall-Wilson | 370/252 |

FOREIGN PATENT DOCUMENTS

| | | |
|---|---|---|
| EP | 1580974 A | 9/2005 |
| EP | 1672900 A | 6/2006 |
| JP | 10224857 | 8/1998 |
| JP | 10-322397 | 12/1998 |
| JP | 2004-080630 | 3/2004 |
| JP | 2006174477 | 6/2006 |
| WO | 2005013590 | 2/2005 |
| WO | 2005013590 A1 | 2/2005 |

OTHER PUBLICATIONS

Partial European search report; Application No. 07104533.0-2413; P108171EP00/DNL, Nov. 22, 2007, 4 pages.
Extended European search report; Application No. 07104533.0-2413 P108171EP00/DNL, May 20, 2008, 6 pages.
Japanese Office Action dated Jan. 4, 2011 for application No. 2006-193141.
Japanese Notification of Reason for Refusal dated Apr. 5, 2011 for application No. 2006-193141.

* cited by examiner

*Primary Examiner* — Asad Nawaz
*Assistant Examiner* — Joel Hamel
(74) *Attorney, Agent, or Firm* — Smith, Gambrell & Russell, LLP

(57) ABSTRACT

This invention relates to a communication system using an internet protocol (IP) address. Subscriber terminals have the same subscriber identification and different IP addresses. A server establishes a connection between the terminals via the network. A service system has a table including the subscriber identification information and the IP addresses of the subscriber terminals.

When a connection request is made by a subscriber terminal to the group of subscriber terminals while a connection between one subscriber terminals of the group and another subscriber terminal is established, the service system detects an unused IP address associated with the common subscriber identification information of the group of subscriber terminals in the table and notifies the unused IP address to the sever, and the sever makes a call to a subscriber terminal in accordance with the unused IP address.

5 Claims, 9 Drawing Sheets

| | USER NAME (210) | SUBSCRIBER IDENTIFICATION INFORMATION (IP TELEPHONE #) | IP ADDRESS (250) | PRIORITY | CONNECTION STATUS | AUTHENTICATION STATUS | CURRENT POSITION |
|---|---|---|---|---|---|---|---|
| 1 | USER NAME 1 | 050-2390-4568 | 10.1.0.5 | 1 | USE | COMPLETED | UNKNOWN |
| | | | 192.168.2.2 | 2 | WAITIG | NOT YET | X1.2-Y1.2 |
| 2 | USER NAME 2 | 050-2340-1111 | | | DISCONNECTING | NOT YET | |
| 3 | USER NAME 3 | 050-4561-1234 | 192.168.1.10 | 1 | WAITIG | COMPLETED | X2.1-Y2.1 |
| 4 | USER NAME 4 | 050-1234-5678 | 192.168.10.5 | | CONNECTION IN PROGRESS | NOT YET | UNKNOWN |
| 5 | USER NAME 5 | 050-4321-9999 | | | DISCONNECTING | NOT YET | |
| 6 | USER NAME 6 | 050-2222-3333 | 10.2.0.10 | | WAITIG | NOT YET | X5.1-Y5.1 |
| | | | 10.32.132.12 | | WAITIG | | X5.2-Y5.2 |

| USER NAME (210) | SUBSCRIBER IDENTIFICATION INFORMATION (IP TELEPHONE #) | IP ADDRESS (250) | PRIORITY | CONNECTION STATUS | AUTHENTICATION STATUS | CURRENT POSITION |
|---|---|---|---|---|---|---|
| 1 USER NAME 1 | 050-2390-4568 | 10.1.0.5 | 1 | USE | COMPLETED | UNKNOWN |
| | | 192.168.2.2 | 2 | WAITIG | NOT YET | X1.2-Y1.2 |
| 2 USER NAME 2 | 050-2340-1111 | | | DISCONNECTING | NOT YET | |
| 3 USER NAME 3 | 050-4561-1234 | 192.168.1.10 | 1 | WAITIG | COMPLETED | X2.1-Y2.1 |
| 4 USER NAME 4 | 050-1234-5678 | 192.168.10.5 | | CONNECTION IN PROGRESS | NOT YET | UNKNOWN |
| 5 USER NAME 5 | 050-4321-9999 | | | DISCONNECTING | NOT YET | |
| | | 10.2.0.10 | | WAITIG | NOT YET | X5.1-Y5.1 |
| 6 USER NAME 6 | 050-2222-3333 | 10.32.132.12 | | WAITIG | | X5.2-Y5.2 |

Fig. 4

| | USER NAME (210) | POSITIONS OF STORING CERTIFICATES FOR AUTHENTIFICATION | POSITION OF STORING PRIVATE-KEYS |
|---|---|---|---|
| 1 | USER NAME 1 | /use/auth/certificate 1 | /use/auth/priv-key 1 |
| 2 | USER NAME 2 | /use/auth/certificate 2 | /use/auth/priv-key 2 |
| 3 | USER NAME 3 | /use/auth/certificate 3 | /use/auth/priv-key 3 |
| 4 | USER NAME 4 | /use/auth/certificate 4 | /use/auth/priv-key 4 |
| 5 | USER NAME 5 | /use/auth/certificate 5 | /use/auth/priv-key 5 |

Fig. 5

| USER NAME (210) | SUBSCRIBER IDENTIFICATION INFORMATION (IP TELEPHONE #) | REGISTRATION POSITION | PRIORITY |
|---|---|---|---|
| 1 USER NAME 1 | 050-2390-4568 | X1.1-Y1.1 | 1 |
|  |  | X1.2-Y1.2 | 2 |
| 2 USER NAME 2 | 050-2340-1111 | NOT SET |  |
| 3 USER NAME 3 | 050-4561-1234 | X2.1-Y2.1 | 1 |
|  |  | X2.2-Y2.2 | 2 |
| 4 USER NAME 4 | 050-1234-5678 | X3-Y3 | 1 |
| 5 USER NAME 5 | 050-4321-9999 | NOT SET |  |
| 6 USER NAME 6 | 050-2222-3333 | X5.1-Y5.1 | 1 |
|  |  | X5.2-Y5.2 | 2 |

Fig. 6

COMMUNICATION SYSTEM

BACKGROUND OF THE INVENTION

1. Field of the Invention

The present invention relates to a communication system that includes subscriber terminals, connected to a fixed network and/or a mobile communication network that can utilize the Internet and also to a wireless LAN, and a system for performing control for causing the terminals to receive calls from other terminals.

2. Description of the Related Art

Conventionally, for using the Internet through different networks, a service has only been usable in one closed network.

In recent years, the number of services that can be realized based on an internet protocol (IP) is gradually increasing and communication services across different networks have become available.

A technology for connecting to a callee by changing a service format of a terminal used by a caller is proposed for terminals owned by subscribers. For example, Japanese laid open Patent Application No. 10-322397 is proposed that, even when the contents of services in multiple networks are different from each other, the same terminal can use the services seamlessly (seamlessly).

On the other hand, a subscriber may have multiple terminals that can use the same service provided by a communication system. In such a case, the subscriber may wish to consciously select a terminal to be used to receive the service.

For example, there is a demand for a scheme that allows different terminals to receive an incoming-call service of an IP phone or the like by using the same phone number. That is, there is a need for a system that allows a call to be received even when different terminals are used for respective networks.

In addition, during such an operation, it is desirable that the user specifies a terminal that is desired to be actually called up. For example, there is a demand for a scheme that allows a terminal desired by the user to receive a call, when an IP phone and a mobile phone can use the same phone number.

There is also a need for a function for specifying a priority and using a lower-order terminal as a connection destination when the user is called up by another subscriber and the terminal is being used for phone conversion or the like.

SUMMARY OF THE INVENTION

Accordingly, an object of the present invention is to allow, when one subscriber terminal owned by a subscriber (user) is being used, another subscriber terminal owned by the subscriber to receive an incoming call, by using the same subscriber identification information for multiple terminals owned by the subscriber (user) (e.g., the same phone number for an IP phone and a mobile phone) in a system using an internet protocol.

In order to achieve the foregoing objects, a preferred embodiment of the present invention employs the following configurations.

A communication system includes a plurality of subscriber terminals for controlling connections between subscriber terminals by use of internet protocol (IP) address. The subscriber terminals include at least one group of subscriber terminals having common subscriber identification information and different IP addresses, respectively.

The communication system comprises a server and a service system. The server establishes connection between the subscriber terminals via a network. The service system has a table including the subscriber identification information and the IP addresses of the subscriber terminals.

When a connection request is made by a subscriber terminal to the group of subscriber terminals while a connection between one subscriber terminals of the group and another subscriber terminal is established, the service system detects an unused IP address associated with the common subscriber identification information of the group of subscriber terminals in the table and notifies the unused IP address to the sever, and the sever makes a call to a subscriber terminal in accordance with the unused IP address.

In order to achieve the foregoing objects, a preferred embodiment of the present invention employs the following configurations.

A service system provides information to a sever for establishing connection between the subscriber terminals via a network by the use of IP addresses. The subscriber terminals includes at least one group of subscriber terminals having a common subscriber identification information and different IP addresses, respectively.

The service system comprises a table. The table includes the subscriber identification information and the IP addresses of the subscriber terminals.

When a connection request is made by a subscriber terminal to the group of subscriber terminals while a connection between one subscriber terminals of the group and another subscriber terminal is established, the service system detects an unused IP address associated with the common subscriber identification information of the group of subscriber terminals in the table and notifies the unused IP address to the sever.

In order to achieve the foregoing objects, a preferred embodiment of the present invention employs the following configurations.

A subscriber terminal is connected with a server for establishing connection between a plurality of subscriber terminals via a network. The server is controlled a service system for controlling connection between the subscriber terminals. The subscriber terminals include at least one group of subscriber terminals. The subscriber terminal comprises a transmitter and a priority setter.

The transmitter transmits a subscriber identification information and an IP address to the service system for identifying a subscriber. The IP address is assigned unique IP address in the plurality of subscriber terminals. The subscriber identification information has common identification information in the group of the plurality of subscriber terminals.

The priority setter sets a calling priority of the subscriber terminal in the group of the plurality of subscriber terminals.

BRIEF DESCRIPTION OF THE DRAWINGS

FIG. 4 is a table showing a specific configuration of a user connection information table.

FIG. 5 is a table showing the contents of a user authentication information table 11.

FIG. 6 is a table showing the contents of a registration-position priority table.

DESCRIPTION OF THE PREFERRED EMBODIMENT

An embodiment of the present invention will be described below with reference to the drawings. The configuration of the embodiment is illustrative and the present invention is not limited to the configuration of the present embodiment.

Figure 1:
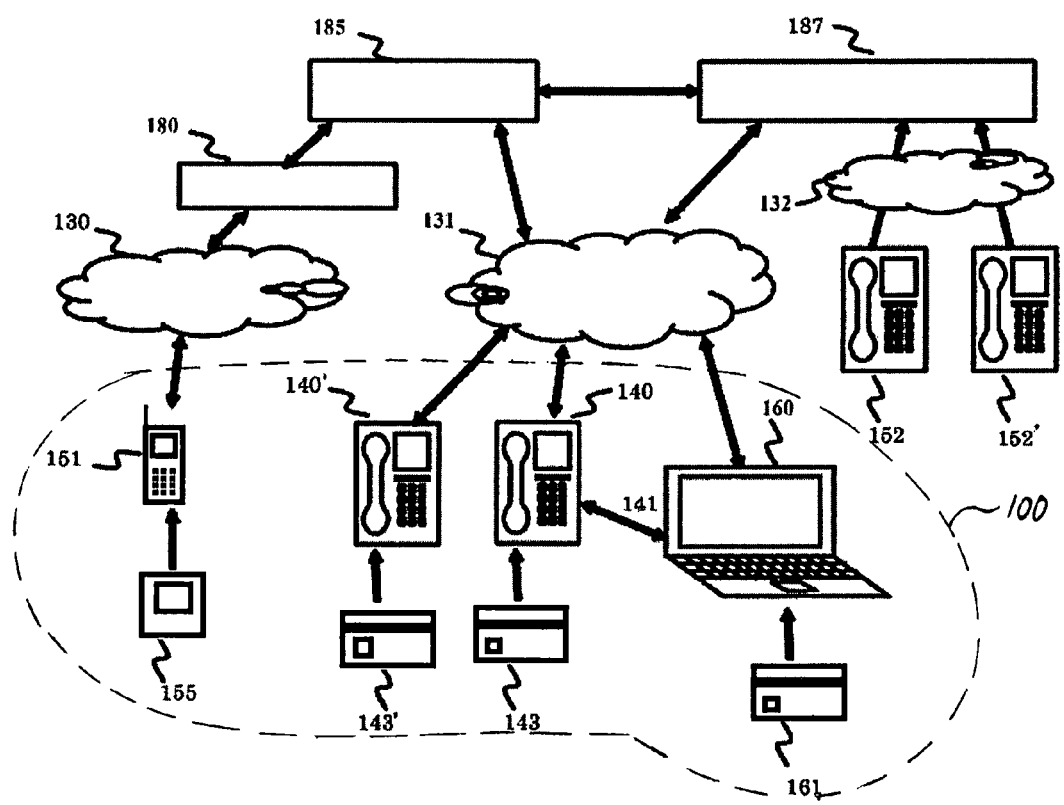
FIG. 1 is a diagram showing the entire configuration of a system.

FIG. 1 is a diagram showing the entire configuration of a system. In the figure, reference numeral 100 indicates a group of subscriber terminals having the same subscriber identification information (e.g., a phone number). Reference numeral 151 indicates a fourth-generation mobile phone. Reference numerals 140 and 140' indicate internet-protocol (IP) phones. Reference numeral 160 indicates a computer.

The fourth-generation mobile phone 151, the internet-protocol phones 140 and 140', and the computer 160 have the same subscriber identification information for identifying the subscriber (e.g., a phone number). The terminal devices have respective IP addresses that are different from each other.

The fourth-generation mobile phone is connected to an active user registry (AUR) 185, owned by a service provider, and an application server 187 through a packet network 130 and a gateway 180 of a communication carrier. The application server 187 provides connections between the subscriber terminals.

The IP phones 140 and 141' are connected to the AUR 185 and the application server 187 through an internet-protocol (IP) network 131.

The computer 160 is connected to the AUR 185 and the application server 187 through the IP network 131.

A wireless LAN may be used to provide connections between the network 131 and the subscriber terminal (e.g., the subscriber terminal 140, 140', or 160).

The application server 187 is a section initiation protocol (SIP) server that uses IP addresses to provide connections between the subscriber terminals.

The AUR 185 includes a server and tables, which are connected to the network, and serves as a service system that provides a service for connecting multiple IP addresses by using the same subscriber identification information. The tables may be directly connected to the server or may be connected to the server via a network. The AUR 185 is managed by the service provider that provides the service. The service provider may be the same as or may be different from a service provider of the application server 187. When they are the same service provider, the AUR 185 may be included in the application server 187.

Subscriber terminals 152 and 152' are connected to the application server 187 through an existing network (e.g., a switched telephone network or an internet phone system) 132.

The subscriber terminal group 100 can be set so that they are identified as being owned by the subscriber or being usable based on authentication information cards 155, 143, 143', and 161 for authenticating the respective terminals.

One example of services provided by this system will be described below.

The subscriber terminal 152', connected to the existing network 132, makes a call to a terminal of the subscriber terminal group 100 having the same subscriber identification information (e.g., a phone number).

Since the subscriber terminal group 100 lies under the IP network and the packet network covering an IP network, line connections of the subscriber terminal group 100 are controlled by the application server 187 for managing line connections of the networks.

The application server 187 accesses the AUR 185, when a request for connecting to the subscriber identification information (e.g., a phone number) occurs.

The AUR 185 returns a connection IP address corresponding to the subscriber identification information (e.g., a phone number) to the application server 187. In this case, in accordance with priorities in the table in the AUR 185, the AUR 185 detects a connection IP address that has the highest priority and returns the IP address to the application server 187.

Based on the IP address received from the AUR 185, the application server 187 causes a specific subscriber terminal to accept a call. When the IP address corresponding to the subscriber identification information (e.g., a phone number) indicates the fourth-generation mobile phone 151, the application server 187 performs call-receiving processing on the fourth-generation mobile phone 151 through the gateway 180 and the packet network 130.

When the subscriber terminal 152' and the fourth-generation mobile phone 151 are making a phone conversion, the subscriber terminal 152 issues, to the application server 187 through the network 132, a call request for the subscriber identification information (e.g., the phone number) of the fourth-generation mobile phone 151.

When a request for connecting to the subscriber identification information is issued, the application server 187 accesses the AUR 185.

The AUR 185 returns a connection IP address corresponding to the subscriber identification information to the application server 187. In this case, the AUR 815 returns a connection IP address in accordance with the table in the AUR 185.

By referring to the table in the AUR 185, the AUR 185 recognizes that the subscriber identification information to which the call connection request was issued is already used by the subscriber terminal 152' and the fourth-generation mobile phone 151. Thereafter, the AUR 185 detects terminals having the same subscriber identification information, and returns the IP address of a subscriber terminal to the application server 187 in accordance with the priorities recorded in the table. When the priority of the common subscriber identification information in the table is given to the IP phone 140, the AUR 185 returns the IP address of the IP phone 140 to the application server 187.

With this arrangement, even when the same subscriber identification information (e.g., a phone number) is being used in a network, a connection can be made with another terminal of a subscriber terminal group owned or registered by the subscriber.

In this example, the terminals of the subscriber terminals 152 and 152' may be IP phones, mobile phones, or general phones. Also, a call may be made from one of the group of terminals owned by the subscriber.

When the table in the AUR 185 is set so that an IP address being used can be called up, a phone conversation being made can be interrupted.

In order to achieve the service shown in FIG. 1, the subscriber needs to write desired priorities to the table in the AUR 185.

Figure 2:
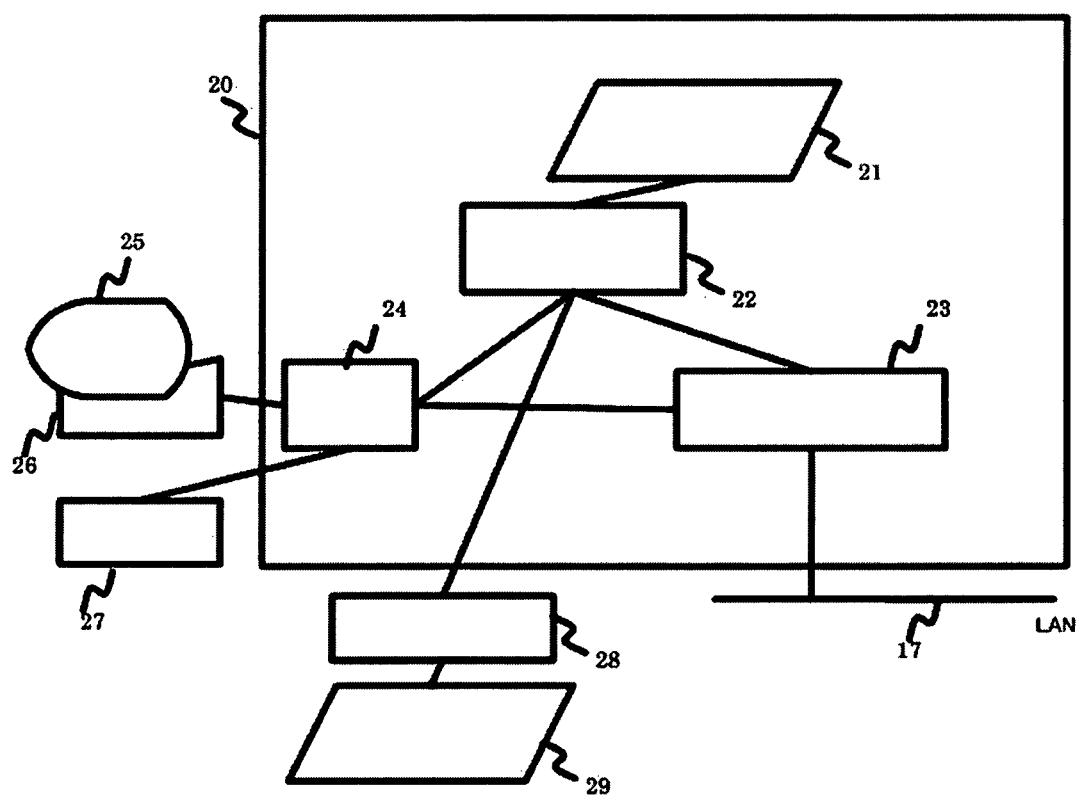
FIG. 2 is a diagram showing a terminal-side program configuration.

With the configuration of a terminal-side program as shown in FIG. 2, the subscriber terminal transmits user authentication information, stored in a medium (such as a SIM card), to the AUR 185 and the subscriber terminal specifies the priorities, thereby performing the priority setting.

When there is no need to change the setting of the AUR 185, a regular connection service provided by the AUR can be received without having to send the authentication information to the AUR 185.

FIG. 2 shows the configuration of a program of the subscriber terminal side. Reference numeral 20 indicates the configuration of a program in the user terminal 20, 22 indicates user-authentication information processing, 21 indicates user-authentication-information file, 23 indicates communication processing, and 24 indicates system control processing.

In order to read user authentication information, the user-authentication-information processing 22 writes, for example, the contents of a user authentication card 29 inserted into a card reader 28 to the user authentication information file of the subscriber terminal side and transmits it to the AUR side via the communication processing 23. During authentication processing, a public-key infrastructure (PKI) may be used.

The communication processing 23 manages message exchange with the AUR 185 and transfers authentication information and user connection information.

The system control processing 24 has functions for causing a display device 25 to display setting information transmitted from the AUR 185 side and for returning information (priority information) set by the user with information inputting means, such as a keyboard 26, via the communication processing 23.

The system control processing 24 transmits an IP address, obtained during communication of the communication processing 23, to the AUR 185.

In addition, when the position of a subscriber terminal can be determined by a GPS or the like which is a known technology, the system control processing 24 has a function for transmitting position information, received from a GPS card 27, to the AUR side via the communication processing 23.

When the AUR 185 side confirms that the user authentication information is valid, an authentication status described below and shown in FIG. 4 indicates "completed".

This priority can be explicitly specified by the owner of the subscriber identification information (an IP phone number), based on the method described with reference to FIG. 2.

User authentication information is needed as information required for setting the priorities.

The AUR 185 includes tables that contain information for connecting the server and subscribers connected in the network.

Figure 3:
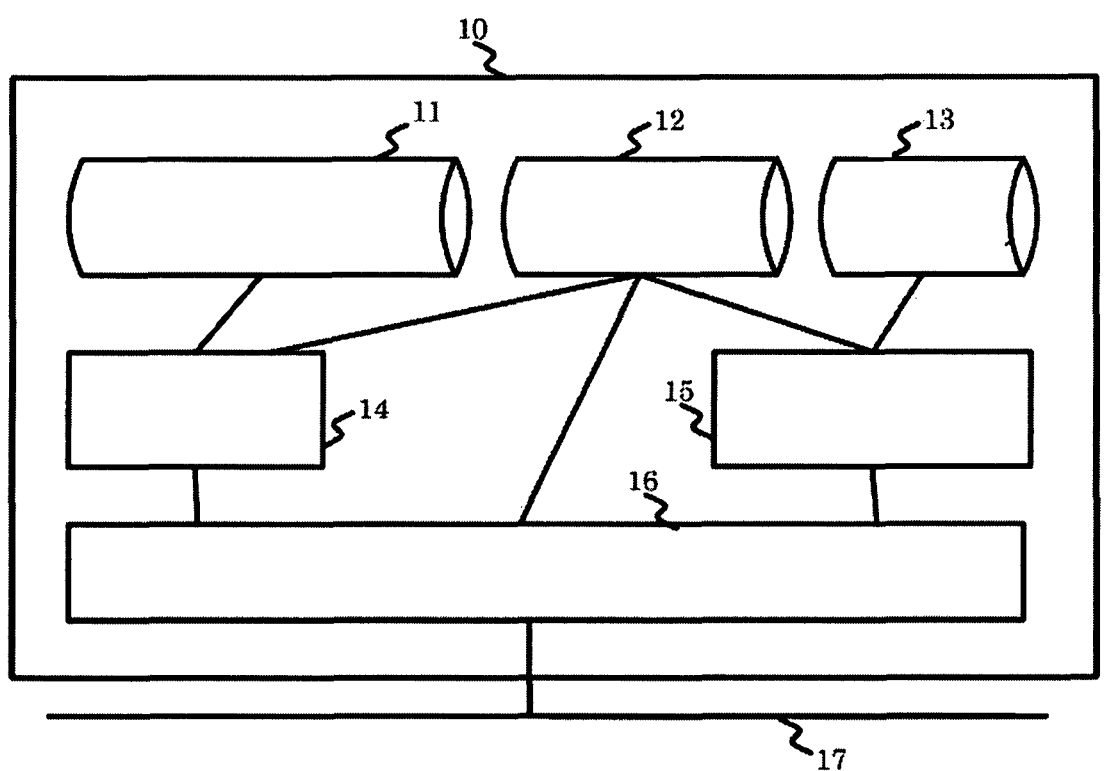
FIG. 3 is a diagram showing the configuration of a program in an AUR 185.

FIG. 3 is a diagram showing a program configuration 10 in the AUR 185.

The AUR 185 shown in FIG. 3 has a communication processing component, a user-authentication processing component, and a user-connection-information management component, which can set the contents of a user authentication information table, a user connection information table, and a registration-position priority table, as indicated by connected lines.

In the figure, reference numeral 11 indicates a user authentication information table, 12 indicates a user connection information table, 13 indicates a registration-position priority table, 14 indicates a user authentication program, 15 indicates a user connection information management table, 16 indicates a communication processing program, and 17 indicates a network such as a local area network.

A specific configuration of the user connection information table 11 shown in FIG. 3 is shown in FIG. 4. In the user connection information table 11, information indicating IP addresses, priorities, and current subscriber-terminal statues is tabularized so as to correspond to phone numbers.

When a call-up is made from another user by using subscriber identification information (an IP phone number) and there are multiple subscriber terminals having connectable IP addresses, a notification is issued to the application server 187 that provides a service for an IP address having the highest priority in the user connection information table 11. The application server 187 can call up a subscriber terminal having the IP address.

The user authentication processing 12 checks whether or not the contents of authentication information sent from the terminal-side software shown in FIG. 2 are credible. As a method for the checking, a public key infrastructure (PKI), which is a known technology, may be employed.

The user connection information management 15 sets the contents of the user connection information table 12 and the registration-position priority table 13 and writes setting information and position information, which are specified by the subscriber terminal side, in the tables.

The communication processing 16 manages message exchange with the subscriber terminals, calls up necessary processing in the AUR, calls up a message to be returned to the subscriber terminal side, processes it, and transmits the resulting message to the subscriber terminal side.

The communication processing 16 sequentially writes subscriber-terminal communication states (e.g., "in use", "during disconnection", and "connection in progress") to the user connection information table 12.

The contents of the user connection information table 12 shown in FIG. 3 are shown in the table of FIG. 4.

The table shown in FIG. 4 has a user name (user name) column, a subscriber identification information column, an IP address column, a priority column, a connection status column, an authentication status column, and a current position column.

Each user has a unique user name and corresponding subscriber identification information (an IP phone number).

One user may have multiple pieces of subscriber identification information (IP phone numbers). One piece of subscriber identification information (an IP phone number) has at least one IP address for connection. One IP address is given to each subscriber terminal that is owned by (under the control of) or a subscriber (user) or that can be subjected to authentication processing. In addition, the IP address may be a fixed address, such as a global address, or may be an IP address temporarily assigned by a dynamic host configuration protocol (DHCP) server.

In the priority column, a subscriber (user) can set a priority for each IP address, based on the method described with reference to FIG. 2.

The state of a communication service based on each IP address is managed by the communication processing 16 and is distinguished by "in use", "waiting for incoming call", "during disconnection", "connection in progress", and so on. These statues are written into the connection status column by the communication processing 16.

The authentication state column in the user connection information table 12 indicates "completed" when the user authentication processing 14 confirms the credibility of authentication information.

When an IP-address-ready subscriber terminal has a GPS card for detecting position information and the communication processing 23 of the subscriber terminal side sends a current position, the communication processing 16 writes the position information of the subscriber terminal to the current position column for each IP address.

A specific description will be given below using an example of first subscriber identification information row of a user name 1.

User Name Column:
a user name 1 and information are written.
Subscriber Identification Information Column:
An IP phone number associated with 050-2390-4568 and the user name 1 are written. In this example, an IP phone number is used as the subscriber identification information, but it is not limited to an IP phone number.
IP Address Column:
Two IP addresses, i.e., 10.1.0.5 and 192.168.2.2, are written. This means that the subscriber of the user name 1 has two terminals and the same subscriber identification information is set for the two terminals.
Priority Column:
It is shown that the priority of the IP address 10.1.0.5 is set to the first by the subscriber.
It is shown that the priority of the IP address 192.168.2.2 is set to the second by the subscriber.
Connection Status Column:
It is shown that the IP address 10.1.0.5 is currently used.
It is shown that the IP address 192.168.2.2 is currently in an incoming-call waiting state.
Authentication Status Column:
It is shown that an authentication procedure for the IP address 10.1.0.5 has been completed.
It is shown that an authentication procedure for the IP address 192.168.2.2 has not been completed.
Current Position Column:
It is shown that a GPS function is not provided for the IP address 10.1.0.5 and a current position has not been identified.
It is shown that the IP address 192.168.2.2 is located at coordinates X 1.2-Y 1.2.

Some subscribers, such as the user name 1, have multiple pieces of subscriber identification information, and some other subscribers, such as the user name 2, have only one piece of subscriber identification information.

The contents of the user authentication information table 11 shown in FIG. 3 are shown in the table shown in FIG. 5.

FIG. 5 illustrates an example of the contents of the user authentication table 11 employing a PKI.

The user authentication information table 11 has the column of user names, the column of positions of storing certificates for authentication, and the column of positions of storing private keys for authentication.

Information for authentication is stored at an authentication certification storage position for each user name.

A private key for decrypting encrypted certificate information is written at an authentication private key storage position.

The contents of the registration-position priority table 13 shown in FIG. 3 are shown in the table of FIG. 6.

The registration-position priority table 13 has a user name column, a subscriber identification information column, a registration position column, and a priority column.

For each user or for each piece of the subscriber identification information, the user connection information management 15 writes a position (longitude and latitude) at which it is desired to perform registration by priority and a corresponding priority to the registration-position priority table 13.

The terminal position may be identified as to whether or not the terminal is located in an area within a certain range centered on a registered position, based on the measurement accuracy.

Although priorities can be set with the user authentication information table 11 and the registration-position priority table 13, a higher priority is given to a priority explicitly set by the subscriber (user) during connection.

When the position of a subscriber can be identified and the registration position and the priority of the subscriber terminal are described in the registration-position priority table, the AUR is controlled so as to transmit an IP address to the application server in accordance with the priorities described in the registration-position priority table 13.

Figure 7:
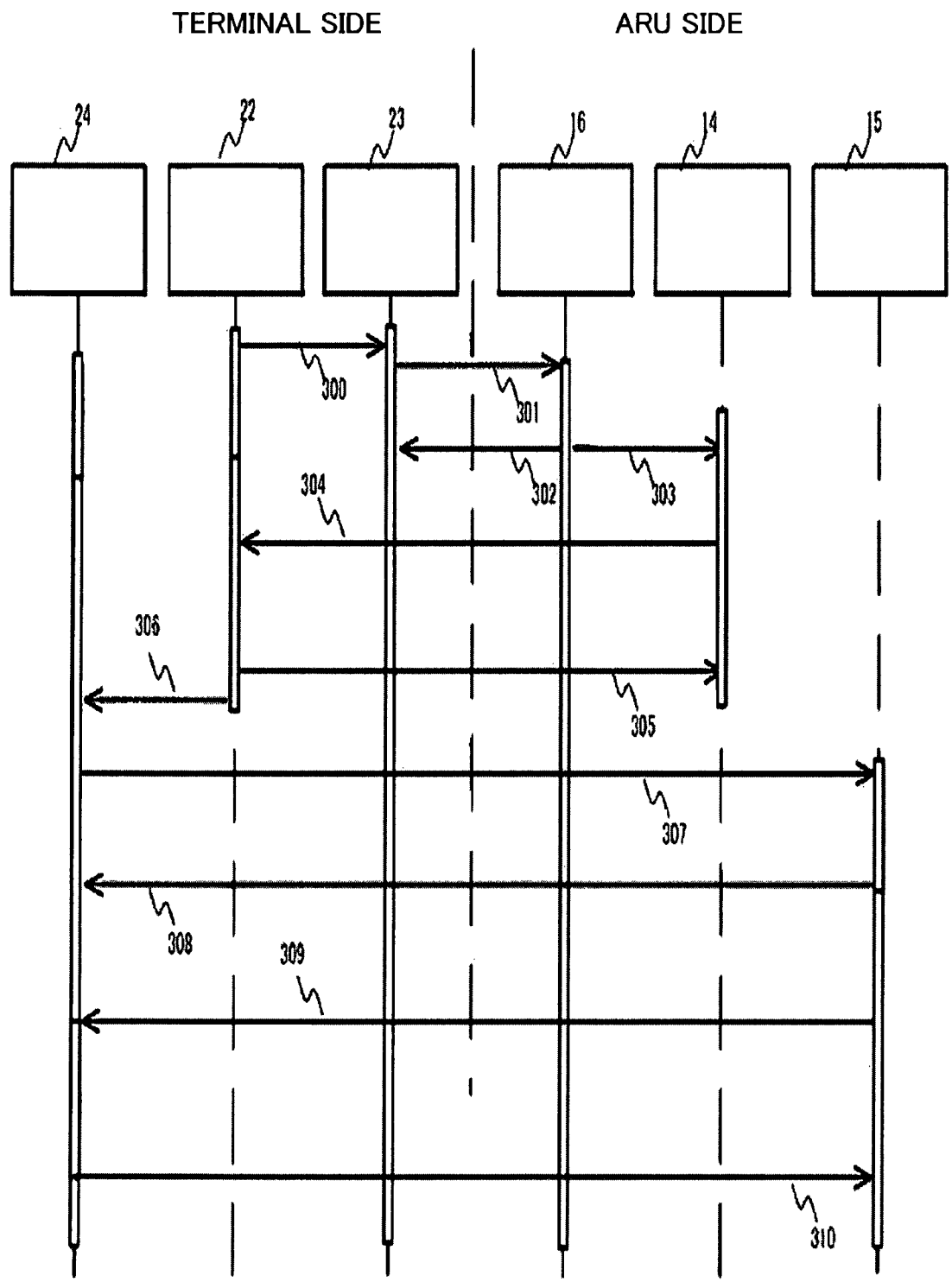
FIG. 7 is a sequence until user connection information is set in the user connection information table.

FIG. 7 shows a sequence until user connection information is set in the user connection information table.

In other words, FIG. 7 is a sequence from the subscriber terminal side until the subscriber terminal puts into an incoming-call state.

A subscriber (user) causes the user authentication information processing 22 to operate to cause the card reader 28 to read authentication information, contained in the user authentication card 29, and to transmit the authentication information 300 to the communication processing 23.

Next, when the reading is completed in the user authentication information processing 22, the communication processing 23 transmits a connection request 301 to the AUR-side communication processing 16.

Next, in response to the connection request transmitted to the communication processing 16, the AUR-side communication processing 23 issues a connection completion notification 302, when a connection between the subscriber terminal and the AUR is ready. Upon receiving the connection completion notification 302, the AUR-side communication processing 23 transmits a connection completion notification 303 to the user authentication processing 14.

Next, upon receiving the connection completion notification, the user authentication processing 14 transmits, as an authentication information request 304, authentication information to the user authentication information processing 22.

Next, the user authentication information processing 22 transmits authentication information 305, contained in the user authentication card 29, to the user authentication processing 14.

Next, the user authentication information processing 22 transmits an authentication completion notification 306, which indicates that the authentication of the subscriber is completed, to the system control processing 24.

Next, the system control processing 24 transmits a terminal-position registration request 307 to the user connection information management 15.

Next, the user connection information management 15 issues a terminal-position registration completion notification 308 to the system control processing 24.

Next, the user connection information management 15 transmits user connection information 309, contained in the user connection information table, to the system control processing 24.

Next, the system control processing 24 transmits user connection setting information 310, which specifies priorities for incoming calls to multiple subscriber terminals having the same subscriber identification information (an IP phone number), to the user connection information management 15. The user connection setting information 310 is data written to the user connection information table and includes a user name, subscriber identification information, registration position, priority, and so on.

Figure 8:
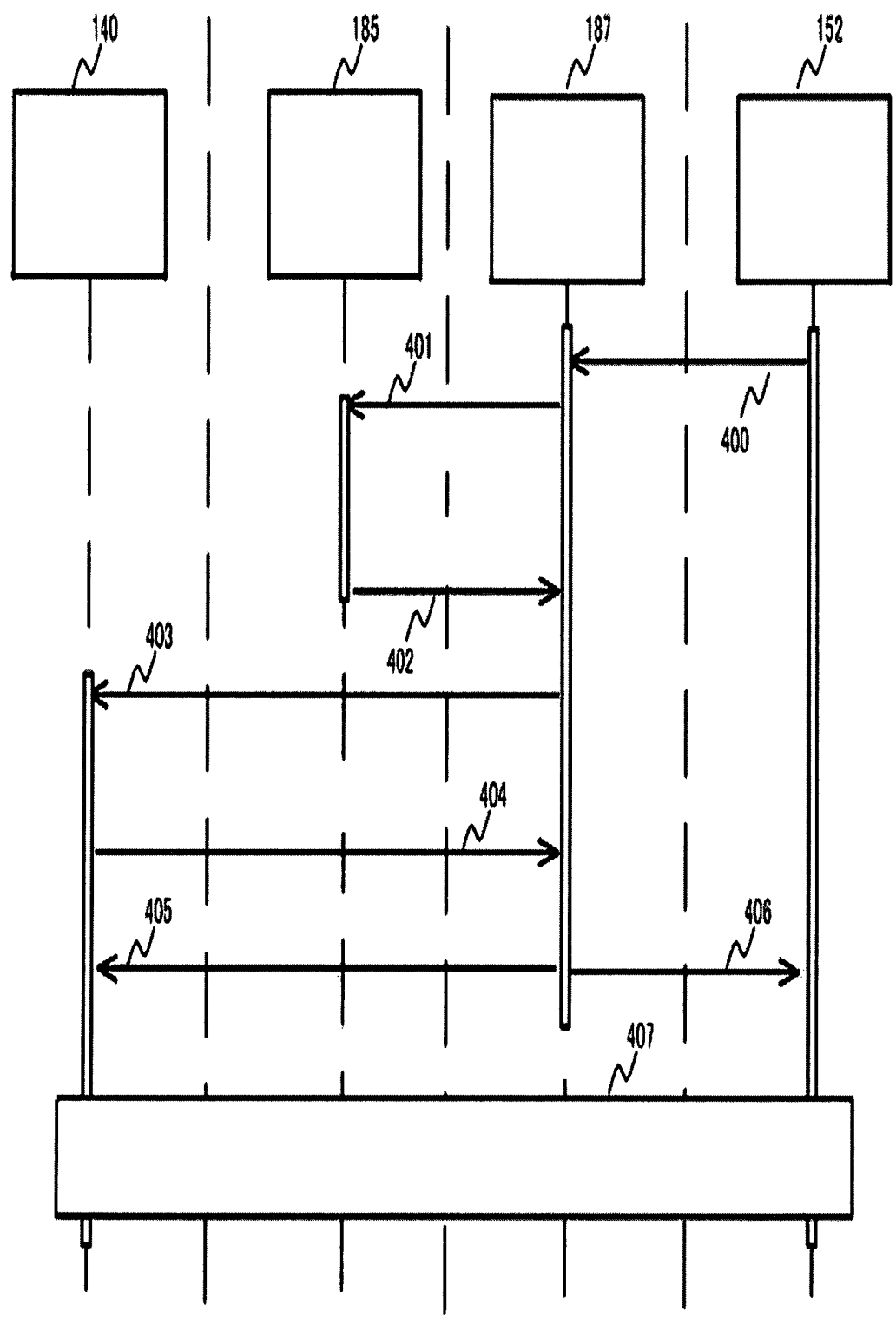
FIG. 8 is a diagram showing a sequence from when another user calls up the user who is waiting for an incoming call until a phone conversation is started.

FIG. 8 shows a sequence from when another user calls up this user waiting for an incoming call and until a phone conversation is started.

When the information management unit 152 issues a call request to the subscriber terminal 140, the subscriber terminal 152 transmits a connection request 400 to the application server 187.

An IP phone number, which is subscriber identification information for identifying a callee, is used for the connection request.

Next, the application server 187 transmits a connection IP address query 401 to the AUR 185.

Next, the user connection information management 15 of the AUR 185 transmits, as a connection-destination IP address response 402, an IP address that complies with the priorities shown in the user connection information table to the application server 187. When the subscriber has not set any priority, the connection is established with an IP address that was connected last time or a connection-destination IP addressed is determined using the service described in Japanese Unexamined Patent Application Publication No. 10-322397 and is reported.

Next, upon receiving the IP address response 402, the application server 187 performs an incoming-call call-up 403 on the subscriber terminal 140 (IP phone).

Next, the subscriber terminal 140 issues an incoming-call response 404 to the application server 187.

Next, the application server 187 transmits phone-conversation start notifications 405 and 406 to the subscriber terminals 140 and 152, respectively.

When the procedure described above is completed, a phone conversation 407 is made.

Figure 9:
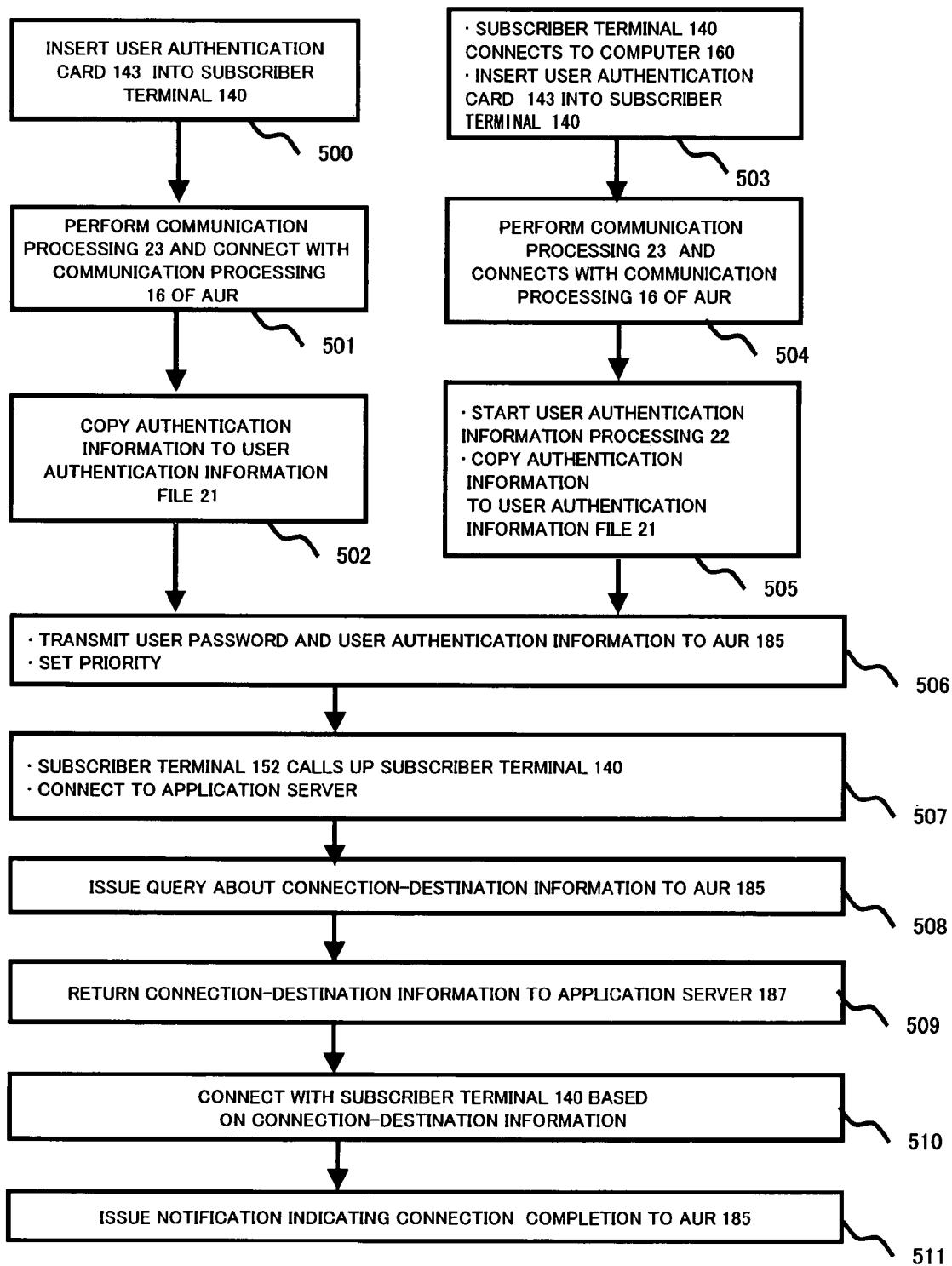
FIG. 9 is a flow chart of a series of processing shown in FIGS. 7 and 8.

A series of processing shown in FIGS. 7 and 8 is shown in the flow chart of FIG. 9.

The flow from step 500 to step 511 is aimed at a system in which the user terminal side has an intra-user-terminal program configuration.

Step 500:

The subscriber inserts a user authentication card 143 into the subscriber terminal (IP phone) 140.

Step 501:

The subscriber terminal (IP phone) 140 launches software, performs the communication processing 23, and establishes a connection with the communication processing 16 of the AUR.

Step 502:

The user authentication information processing 22 of the subscriber terminal (IP phone) 140 checks a user password and copies authentication information, contained in the user authentication card 143, to the user-authentication-information file 21.

Step 506:

When step 501 is completed, the user authentication processing 14 of the AUR 185 transmits an authentication information request to the user authentication information processing 22 of the subscriber terminal 140 side. The user authentication information processing 22 transmits the user password and the user authentication information collected in step 506 to the AUR 185.

When the AUR determines that the subscriber terminal is authenticated as a result of verification, the user connection information management of the AUR side transmits user connection information.

The system control processing 24 of the subscriber terminal side causes a graphical user interface (GUI) 25 to display user connection information.

Based on the displayed information, the subscriber sets a priority for an incoming call by using the keyboard 26.

The set information is written, as a user connection setting information response, to the user connection information table by the AUR-side user connection information management 15.

Step 507:

The subscriber terminal 152 calls up the subscriber terminal 140 and connects to the service-providing application server 187.

Step 508:

The application server 187 issues a query about connection-destination information to the AUR 185.

Step 509:

In turn, the AUR 185 transmits connection information with a highest priority to the server 187.

Step 510:

The application server 187 connects with the subscriber terminal having an IP address transmitted from the AUR 185.

Step 511:

The subscriber terminal 140 issues a notification indicating that the connection is completed to the AUR 185.

The flow in step 503 to step 511 is aimed at a system in which the subscriber terminal side does not have an intra-user-terminal program.

Step 503:

The subscriber terminal (IP phone) 140 connects to the computer 160 connected in the network, through a universal serial bus (USB) cable.

The subscriber inserts a user authentication card 143 to the subscriber terminal (IP phone) 140.

Step 504:

The computer 160 launches software, performs the communication processing 23, and connects to the communication processing 16 of the AUR.

Step 505:

The computer 160 starts the user authentication information processing 22, incorporated therein, to check a password and to copy authentication information contained in the user authentication card 143 to the user authentication information file 21.

According to the present invention, even when one of the subscriber terminals having the same subscriber identification information is in use (i.e., is receiving a call), another subscriber terminal owned by the subscriber can receive a call.

In addition, for the call reception, a desired terminal can receive the call in accordance with a priority specified by the subscriber.

What is claimed is:

1. A communication system for communicably coupling a subscriber terminal and a group of subscriber terminals via a network by use of internet protocol (IP) addresses, the communication system comprising:

subscriber identification information identifying a subscriber;

a group of subscriber terminals belonging to the subscriber identified by the subscriber identification information, the group of subscriber terminals being each assigned a different IP address and each configured to transmit a piece of position information of the each subscriber terminal;

a server configured to communicably couple a plurality of subscriber terminals via the network; and a service system including:
- a user connection information table that stores a piece of position information in association with each of the group of subscriber terminals, and
- a registration-position priority table that stores a priority level in association with each piece of position information corresponding to one of the group of subscriber terminals, wherein upon receiving a piece of position information from one of the group of subscriber terminals, the server system stores the received piece of position information and information on the one of the group of subscriber terminals in the user connection information table;

when a connection request is made by a first subscriber terminal outside the group of subscriber terminals to the group of subscriber terminals while a connection between a second subscriber terminal within the group of subscriber terminals and a third subscriber terminal outside the group of subscriber terminals is established, the service system extracts an unused IP address from among the IP addresses assigned to the group of subscriber terminals, by searching IP addresses assigned to the group of subscriber terminals in order that is determined based on pieces of position information associated with IP addresses in the user connection information table and priority levels assigned to the pieces of position information in the registration-position priority table; and the service system outputs the extracted unused IP address so that the server makes a call from the first subscriber terminal to a fourth subscriber terminal that has the extracted unused IP address in the group of subscriber terminals.

2. The communication system according to claim 1, wherein the subscriber identification information is a phone number.

3. The communication system of claim 1, wherein
in the registration-position priority table, a priority level is set for a piece of position information associated with each subscriber terminal for which authentication process has been successfully performed.

4. A service system for communicably coupling a subscriber terminal and a group of subscriber terminals via a network by use of internet protocol (IP) addresses, the service system comprising:
- a user connection information table that stores a piece of position information in association with each of a group of subscriber terminals belonging to a subscriber identified by subscriber identification information, and
- a registration-position priority table that stores a priority level assigned to each piece of position information associated with one of the group of subscriber terminals, wherein upon receiving a piece of position information from one of the group of subscriber terminals, the server system stores the received piece of position information and information on the one of the group of subscriber terminals in the user connection information table;

when a connection request is made by a first subscriber terminal outside the group of subscriber terminals to the group of subscriber terminals while a connection between a second subscriber terminal within the group of subscriber terminals and a third subscriber terminal outside the group of subscriber terminals is established, the service system extracts an unused IP address from among the IP addresses assigned to the group of subscriber terminals, by searching the IP addresses assigned to the group of subscriber terminals in order that is determined based on pieces of position information associated with IP addresses in the user connection information table and priority levels assigned to pieces of position information in the registration-position priority table; and the service system outputs the extracted unused IP address so that a server communicably coupling a plurality of subscriber terminals via the network makes a call from the first subscriber terminal to a fourth subscriber terminal that has the extracted unused IP address and is included in the group of subscriber terminals.

5. The service system of claim 4, wherein
in the registration-position priority table, a priority level is set for a piece of position information associated with each subscriber terminal for which authentication process has been successfully performed.

* * * * *